United States Patent [19]
Cloutier

[11] Patent Number: 5,966,387
[45] Date of Patent: Oct. 12, 1999

[54] APPARATUS AND METHOD FOR CORRECTING JITTER IN DATA PACKETS

[75] Inventor: Leo Cloutier, Bethesda, Md.

[73] Assignee: Bell Atlantic Network Services, Inc., Arlington, Va.

[21] Appl. No.: 08/651,297

[22] Filed: May 22, 1996

Related U.S. Application Data

[63] Continuation-in-part of application No. 08/616,037, Mar. 14, 1996, abandoned, which is a continuation-in-part of application No. 08/533,501, Sep. 25, 1995.

[51] Int. Cl.[6] .................................................. H04J 3/06
[52] U.S. Cl. .................................... 370/516; 375/371
[58] Field of Search .................... 370/474, 476, 370/395, 397, 503, 506, 508, 516, 517, 519; 375/371, 372; 348/423, 474, 500, 432, 439, 497

[56] References Cited

U.S. PATENT DOCUMENTS

| | | |
|---|---|---|
| 4,716,575 | 12/1987 | Douros et al. . |
| 4,898,823 | 2/1990 | Adelmann et al. . |
| 4,984,264 | 1/1991 | Katsube . |
| 5,127,000 | 6/1992 | Henrion . |
| 5,153,578 | 10/1992 | Izawa et al. . |
| 5,229,998 | 7/1993 | Weisser . |
| 5,247,347 | 9/1993 | Litteral . |
| 5,247,464 | 9/1993 | Curtis . |
| 5,260,978 | 11/1993 | Fleischer et al. .................... 375/113 |
| 5,285,446 | 2/1994 | Yonehara . |
| 5,381,181 | 1/1995 | Deiss . |
| 5,390,184 | 2/1995 | Morris . |
| 5,394,395 | 2/1995 | Nagai et al. . |
| 5,396,497 | 3/1995 | Veltman . |
| 5,432,713 | 7/1995 | Takeo et al. ........................ 364/569 |
| 5,452,010 | 9/1995 | Doornink ........................... 348/715 |
| 5,467,342 | 11/1995 | Logston et al. ..................... 370/352 |
| 5,473,385 | 12/1995 | Leske ................................. 348/464 |
| 5,533,021 | 7/1996 | Branstand et al. ................. 348/512 |
| 5,565,924 | 10/1996 | Haskell et al. ..................... 375/371 |
| 5,640,388 | 6/1997 | Woodhead et al. ................. 370/468 |

FOREIGN PATENT DOCUMENTS

| | | |
|---|---|---|
| 3-114333 | 5/1991 | Japan . |
| 4-123549 | 4/1992 | Japan . |
| 4-207435 | 7/1992 | Japan . |
| 5-37560 | 2/1993 | Japan . |

*Primary Examiner*—Ajit Patel
*Attorney, Agent, or Firm*—McDermott, Will & Emery

[57] ABSTRACT

An arrangement (apparatus and method) for detecting jitter caused during transport of digitally-coded information, such as MPEG-encoded data packets, and for correcting time stamp reference values in accordance with the detected jitter. The disclosed arrangement detects program clock reference (PCR) values from an MPEG-encoded transport stream, where each PCR value represents an expected arrival time of a corresponding stream segment. An actual arrival time for the corresponding stream segment is determined in response to detection of the corresponding PCR value and an independent clock signal. The expected arrival time of the stream segment and the actual arrival time are correlated with an accumulation of expected and actual arrival times of previously-received data packet stream segments in order to determine the jitter and the desired expected arrival time of the corresponding stream segment. The jitter is corrected by a combination of adaptive buffering techniques and restamping the PCR value with corrected values coinciding with the actual arrival time of the stream segments. The disclosed arrangement may be implemented in a receiver system, or as part of the network node that minimizes the effects of cell delay variation in an ATM network.

46 Claims, 8 Drawing Sheets

APPARATUS AND METHOD FOR CORRECTING JITTER IN DATA PACKETS

This is a continuation-in-part of U.S. application Ser. No. 08/616,037, filed Mar. 14, 1996, now abandoned and retained, and a continuation-in-part of allowed U.S. application Ser. No. 08/533,501, filed Sep. 25, 1995, the disclosures of which are incorporated in their entirety by reference.

TECHNICAL FIELD

The present invention relates to network monitoring devices used to monitor timing errors created during transport of digital information through packet switched networks such as Asynchronous Transfer Mode (ATM) networks.

BACKGROUND ART

There is a trend in the communications industries to develop digital systems that provide more efficient transmission of information. This development is found in digital cellular telephone systems, facsimile transmission systems, data networking systems, and video distribution systems. A number of systems have recently been proposed for distributing information in digital data form using Asynchronous Transfer Mode (ATM) technology.

ATM technology has been designed with the intention of providing service for a wide variety of applications such as voice, video, and data. Each of these applications has different service requirements in terms of cell loss, time delay, and cell delay variation. For example, voice traffic can withstand a small amount of cell loss, but it is rather intolerant to time delay and cell delay variation. Due to the asynchronous statistical nature of ATM, voice traffic must be smoothed at the receiver end in order to eliminate any accumulated cell delay variation incurred in the network. The requirements for video traffic are somewhat dependent upon coding and compression schemes. These coding schemes can produce either constant bit-rate or variable bit-rate traffic. Data services can withstand a considerable amount of time delay and cell delay variation, but cannot lose any information, or else retransmission is required. Video traffic can typically tolerate a small amount of cell loss, however, it is sensitive to time delay and cell delay variation, and asynchronous transport of video creates a number of problems as discussed more fully below.

Various wideband digital distribution networks have been proposed for offering subscribers an array of video services, including true Video On Demand Service. For example, U.S. Pat. No. 5,247,347 to Litteral et al., assigned in common with the present invention and incorporated herein in its entirety by reference, integrates a public switched telephone network with video-on-demand service. A Digital Cross-connect System (DCS) receives compressed video data from a video provider and supplies the video data to selected central office (CO) interfaces. Electronic devices associated with the subscriber loops modify the transmission characteristics of the subscriber loops to permit delivery of full motion video information over existing loop plant facilities.

Such wideband distribution networks transport digitized, compressed video program information supplied from a video headend in order to improve transport efficiency. For example, MPEG (moving picture experts group) is a broad generic standard for digital video program compression. A number of specific compression algorithms satisfy MPEG requirements. MPEG-2 is a second generation compression standard capable of encoding video program material into a 6 Mbits/sec bit stream and packetizing a number of 6 Mbits/sec channel streams into a single higher rate signal transport stream.

At the subscriber premises, the digital compressed program stream transported by the wideband digital distribution networks must be recovered in order to provide the video information to video display systems for displaying the video information to the subscribers. Unlike a computer data file composed of data downloaded from a remote server for use in a local computer, certain applications such as voice reproduction and presentation of animated video requires synchronous presentation in order to provide intelligible information to the user. Video data, by definition, consists of "real-time" information, requiring synchronization of the encoding and decoding processes to insure accurate real-time reproduction for viewing. Various MPEG receiver systems have been developed to synchronize MPEG decoders to a received MPEG-encoded stream. Basic MPEG receiver systems synchronize internal clocks to received time stamp values, known as Program Clock Reference (PCR) values, by sampling the PCR values, calculating the difference between the sampled PCR values and counted internal clock values (C) between PCR samples to obtain an error signal, and outputting an error signal to the internal clock to synchronize the internal clock according to the calculated difference.

U.S. Pat. No, 5,396,497 to Veltman discloses an MPEG I demultiplexer/decoder including a clock producing a time reference, and a demultiplexing switch separating a composite data stream into audio sample batches, audio time stamps, video frames, and video time stamps. The disclosed demultiplexer/decoder also includes an audio phase locked loop that produces an audio timing signal in response to the audio time stamps and time reference, and a video phase-locked loop that produces a video timing signal in response to the video time stamps and the timing signal. The audio timing signal and the video timing signal are supplied to audio and video decoders, respectively. Data packets in the MPEG I stream, referred to as a system clock reference (SCR), are used to control the transfer data rate in the decoder. The SCR is used during initialization of the device in order to synchronize the phase-locked loops with the respective data streams.

U.S. Pat. No. 5,381,181 to Deiss discloses a clock recovery apparatus for an MPEG I decoded signal. According to Deiss, the receiver comprises a counter, responsive to a controlled receiver clock signal, that is sampled at the arrival of a count value embedded in the MPEG transport layer. The differences of successive sampled count values from the receiver counter are compared with the differences of corresponding successive values of the MPEG count value in the MPEG transport layer to provide a signal to control the receiver clock signal.

FIG. 1 is a simplified block diagram of the clock recovery apparatus disclosed in Deiss. The clock recovery apparatus comprises a PCR detector 10 that receives a MPEG I-encoded data stream. The MPEG stream comprises count values, denoted program clock references (PCR), embedded as auxiliary data within the transport packets. As disclosed in Deiss, these PCRs are supplied during encoding of the video signal as presentation time stamps in order to provide lip synchronization of associated audio and video information at the receiver.

The PCR detector 10 produces a control pulse 10*a* to a counter 12 upon the detection of a PCR value in the data stream. The counter 12 is driven by a voltage controlled oscillator (VCXO) 14. Upon receiving the control pulse 10*a*, the counter 12 outputs the count value to a subtraction circuit 16, and resets itself to restart counting modulo 230 in response to the count pulses from the VCXO 14. The subtractor 16 calculates an error signal (E) in response to the differences between the detected PCR values from the MPEG stream and the counted values (L) latched from the counter 12. Thus, according to Deiss, the error signal E is calculated by the subtractor 16 according to the following equation:

$$E=|PCR_n-PCR_{n-1}|-|L_nL_{n-1}|$$

The calculated error signal E is passed through a low pass filter 18 and then applied to the VCXO 14, designed to operate substantially at 27 MHz. The error signal E is utilized to condition the voltage controlled oscillator 14 to a frequency tending to equalize the differences between the counted values output by the counter 12 and the detected PCR values from the MPEG stream to enable the MPEG stream to be decoded by the MPEG decoder 20. Thus, Deiss contemplates adjusting the system clock to synchronize with the detected PCR stream.

As disclosed in Deiss, the digital video signal transmission arrangement generates presentation time stamps (PTRs) in response to a fixed frequency 27 MHz clock in the encoder. In addition, the receiver system of Deiss is intended to perform the inverse function of the encoder and transmitting modem at the transmitting headend. As such, Deiss assumes that there is no differential delay in the transport of the MPEG encoded stream, such that the detected PCR values at the receiver end represent an interarrival time corresponding to the interdeparture time defined by the system clock at the encoder.

However, attempts to improve the core switching, multiplexing and transmission technologies in integrated digital networks for transport of voice, data and video services to multiple users may cause differential delays in the transport of the digital data. ATM provides broad-bandwidth, low delay, packet switching and multiplexing at speeds of 1.544 Mbit/s to 1.2 gigabits per second (Gbit/s), whereby usable capacity can be assigned dynamically (on demand) by allocating bandwidth capacity to fixed-sized information-bearing units called "cells". Each cell contains header and information fields. The ATM standard, CCITT.121/2 specifies a 53 byte cell which includes a 5 byte header and a 48 byte payload.

The conversion of MPEG-2 data into ATM cell format, however, may impose differential timing delays due to the transport of the ATM cells throughout the network. The "asynchronous" nature of ATM causes timing problems in reception and reproduction of certain types of broadband information.

Further, certain transmission protocols may require a stream of continuous data. Thus, an ATM data stream carrying MPEG video data may need to be padded with ATM idle cells, or "dummy cells", in order to ensure proper synchronization with the physical layer. Adding such idle cells may create delays between the ATM cells carrying the respective PCR values of the MPEG stream. Moreover, delays in the ATM cell stream are introduced each time an ATM cell stream passes through an ATM switch. Finally, different ATM cell streams may be multiplexed together to improve transport efficiency in the broadband network. For example, commonly-assigned, copending application Ser. No. 08/380,744, filed Jan. 31, 1995, entitled "Full Service Network Using Asynchronous Transfer Mode Multiplexing" (attorney ref: 680-109), the disclosure which is incorporated in its entirety by reference, discloses an ATM edge device which is used to multiplex a plurality of ATM cells from different input sources onto a reduced number of output paths by combining the cell streams from the different sources.

The delay imposed by each of these different ATM processes varies over time, for example as a function of the data rates of input cells and resultant loading on each ATM processing device. For such reasons, the delay imposed on one cell in a particular stream may vary with respect to the next cell in the same stream.

Thus, an ATM cell stream passing through different ATM network components undergoes cell delay variation, whereby the cell transport rate at a receiving end is different than the cell transport rate at the transmitting end. In other words, ATM transport of MPEG-encoded information causes a variation in the interarrival time between the MPEG packets carried by the ATM cells. The cell delay variation may create a delay on the order of one millisecond, causing the synchronous payload data within the received ATM cell stream to lose the data rate originally output at the transmitting end before conversion to an ATM cell stream. Thus, the reconstructed MPEG stream may have PCR values that do not accurately reflect the interarrival time for the MPEG stream segment due to the differential delay caused by the cell delay variation. Thus, transport through an ATM network creates jitter in the MPEG stream caused by cell delay variation ATM cells carrying the MPEG stream.

As discussed above, the prior art receiver systems assume no differential delay in the PCR values stored in the MPEG stream and assure a uniform, constant delay between data packets. Thus, these prior art systems would be unable to compensate for jitter in the received MPEG stream. Moreover, the jitter in the received MPEG stream in FIG. 1 may cause a miscalculation in the error signal (E) supplied to the VCXO 14, resulting in a loss of synchronization. Thus, any jitter in a received MPEG stream would result in a degradation in receiver performance.

Moreover, a data stream passing through an ATM network receives additional cell delay variation each time the data stream passes through another network component (also referred to as network element or network node), such as an ATM switch. As networks become more complex, data streams may have a greater tendency to reach an unacceptable level of cell delay variation unless the cell delay variation at each node is carefully monitored. Further, the amount of cell delay variation may increase as the performance of a network node deteriorates over time due to hardware or software failures, or traffic overload.

DISCLOSURE OF THE INVENTION

In view of the foregoing, there is a need for an arrangement (apparatus and method) for measuring jitter in a transport stream of digitally coded data packets carrying time stamp values at regular intervals, such as MPEG-encoded data packets carrying PCR values.

There is also a need for an arrangement (apparatus and method) for minimizing jitter caused during transport of a data packet stream through a packet switched network.

There is also a need for an arrangement (apparatus and method) for recovering timing in an MPEG stream that has suffered from cell delay variation during transport through an asynchronous transfer mode (ATM) network.

There is also a need for a broadband receiver adapted to receive ATM cells from a switched broadband ATM network, whereby the received ATM cells carry synchronous data. For example, there is a need for a broadband receiver that can reconstruct and resynchronize synchronous data that has undergone cell delay variation during transport through the ATM network.

There is also a need for a digital entertainment terminal (DET) able to recover an MPEG-encoded data stream from an ATM network, whereby the digital entertainment terminal compensates for jitter in the MPEG-encoded data stream.

There is also a need for an arrangement (apparatus and method) for converting a data stream of ATM cells carrying MPEG-encoded data into an MPEG-encoded packet stream and correcting the jitter in the MPEG-encoded packet stream. Such a converter may be implemented, for example, in an ATM demultiplexer for receiving a plurality of ATM cell streams and outputting a plurality of recovered MPEG packet streams having corrected PCR values.

These and other needs are met by the present invention, in which an arrangement measures and minimizes jitter in a transport stream of digitally-compressed data packets that include time stamp reference values at interval portions within the data stream. The detected jitter, which may be caused during transport in an asynchronous network, can be minimized and corrected to provide a data packet stream having correct time stamp values relative to the corresponding data packet stream. The arrangement can be implemented in a receiver system such as a broadband receiver or digital entertainment terminal at a customer premises site, or may be implemented in a network arrangement as a demultiplexer node or a packet converter that corrects for jitter during the demultiplexing process.

According to one aspect of the present invention, an apparatus for measuring jitter in a transport stream of data packets includes a time stamp detector detecting time stamp values located within the transport stream, each time stamp value identifying an expected arrival time of a corresponding interval portion of the transport stream. The apparatus also includes a counting portion, responsive to an independent clock signal, for identifying an actual arrival time for each corresponding interval portion of said transport stream, a detecting circuit detecting jitter in each data packet stream segment by executing a correlation of the corresponding expected arrival time and the corresponding actual arrival time with an accumulation of expected and actual arrival times of previously-received data packet stream segments. The detected jitter can be applied to a data packet stream correction circuit to output the received data packet stream as a corrected data packet stream having time stamps substantially coinciding with the actual time duration of the corresponding data packet stream segment of the corrected data packet stream.

Moreover, the correlation of the corresponding expected arrival time and the corresponding actual arrival time with an accumulation of expected and actual arrival times of previously-received data packet stream segments provides a more reliable measurement of the jitter and the amount of correction necessary to provide the corrected data packet stream having corrected time stamps.

In another aspect of the present invention, a broadband receiver receiving a data stream carrying asynchronous transfer mode (ATM) cells from a broadband network includes an ATM stream selector for capturing a selected group of ATM cells on the basis of a selected identifier value, an ATM adaptation layer processor for recovering a digital data stream carrying time stamp values, each time stamp value representing an expected arrival time of the corresponding digital data stream segment, a cell delay variation correction circuit. The cell delay variation correction circuit includes a segment delay detection circuit that determines an actual arrival time of the corresponding digital data stream segment by detection of the corresponding time stamp value and calculates an approximated relation between actual arrival times and corresponding time stamp values from previously-received digital data stream segments. The cell delay variation correction circuit also includes a digital data stream correction circuit, responsive to the actual arrival time and the approximated relation, that outputs the digital data stream as a corrected data packet stream having time stamps identifying an expected arrival time substantially coinciding with an actual time duration of the corresponding data packet stream segment of the corrected data packet stream. The corrected data packet stream is output for decompression to obtain information for use by a subscriber.

Hence, present invention may be implemented as a broadband receiver that receives ATM cells from an ATM network, such as fiber to the curb or fiber to the home. The present invention may be particularly effective in correcting MPEG packet streams received at a subscriber premises, and may be used as a correction device that outputs the corrected MPEG stream to a digital entertainment terminal. Alternatively, the present invention may be implemented as an MPEG stream alignment circuit within the digital entertainment terminal itself.

The present invention is also advantageous in correcting jitter at the time that a data packet stream carrying time stamp values is reassembled after transport through an asynchronous network. In the case of ATM networks, the present invention minimizes the effects of cell delay variation. For example, the present invention may be implemented as an ATM-format to MPEG-format converter, also referred to as a cell delay variation module (CDVM), that outputs an MPEG stream after correcting for cell delay variation generated during transport through the network. The invention may be implemented as a network device, such as an ATM demultiplexer, that converts a plurality of ATM cell streams to MPEG data packets before transmission to a local loop distribution network. Alternatively, the invention may be implemented as a timing correction node in an ATM network, whereby a corrected MPEG stream is retransmitted in ATM cells.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

Reference is made to the attached drawings, wherein elements having the same reference numeral designations represent like elements throughout, and wherein.

BEST MODE FOR CARRYING OUT THE INVENTION

The present invention provides detection of jitter in a packet switched network carrying streams of data packets each including time stamp values at regular intervals representing the expected arrival time of the respective segments of the data packet stream. A jitter correction circuit may be used to correct the detected jitter. A description will first be provided of an ATM network architecture and an exemplary encoding system at a video headend that outputs a data stream to the ATM network, followed by exemplary implementations of the invention.

The present invention is directed to the monitoring and correction of jitter generated during transport in a packet switched network such as an ATM network. As recognized in the art, the term jitter refers to time deviations or delays in the actual data rate of a received data packet compared to the expected data rate. The time deviations are typically created during switching and multiplexing operations in the network. Thus, the data rate of a packet stream after transport on the network is different than the original data rate of the packet stream before transport. Such time deviations are present in networks using asynchronous transport mode (ATM) technology, and in such networks the time deviations are referred to as cell delay variations.

Examples of ATM transmission techniques are disclosed in commonly-assigned, co-pending application Ser. No. 08/250,792, filed May 27, 1994, entitled FULL SERVICE NETWORK (attorney docket 680-080), and the commonly-assigned, co-pending application Ser. No. 08/370,744, filed Jan. 31, 1995, entitled FULL SERVICE NETWORK USING ASYNCHRONOUS TRANSFER MODE MULTI-PLEXING (attorney docket 680-109), the disclosures of which are incorporated in their entirety herein by reference. The apparatus disclosed in these identified applications use ATM processing for transport of video information, including broadcast video information.

Figure 1:
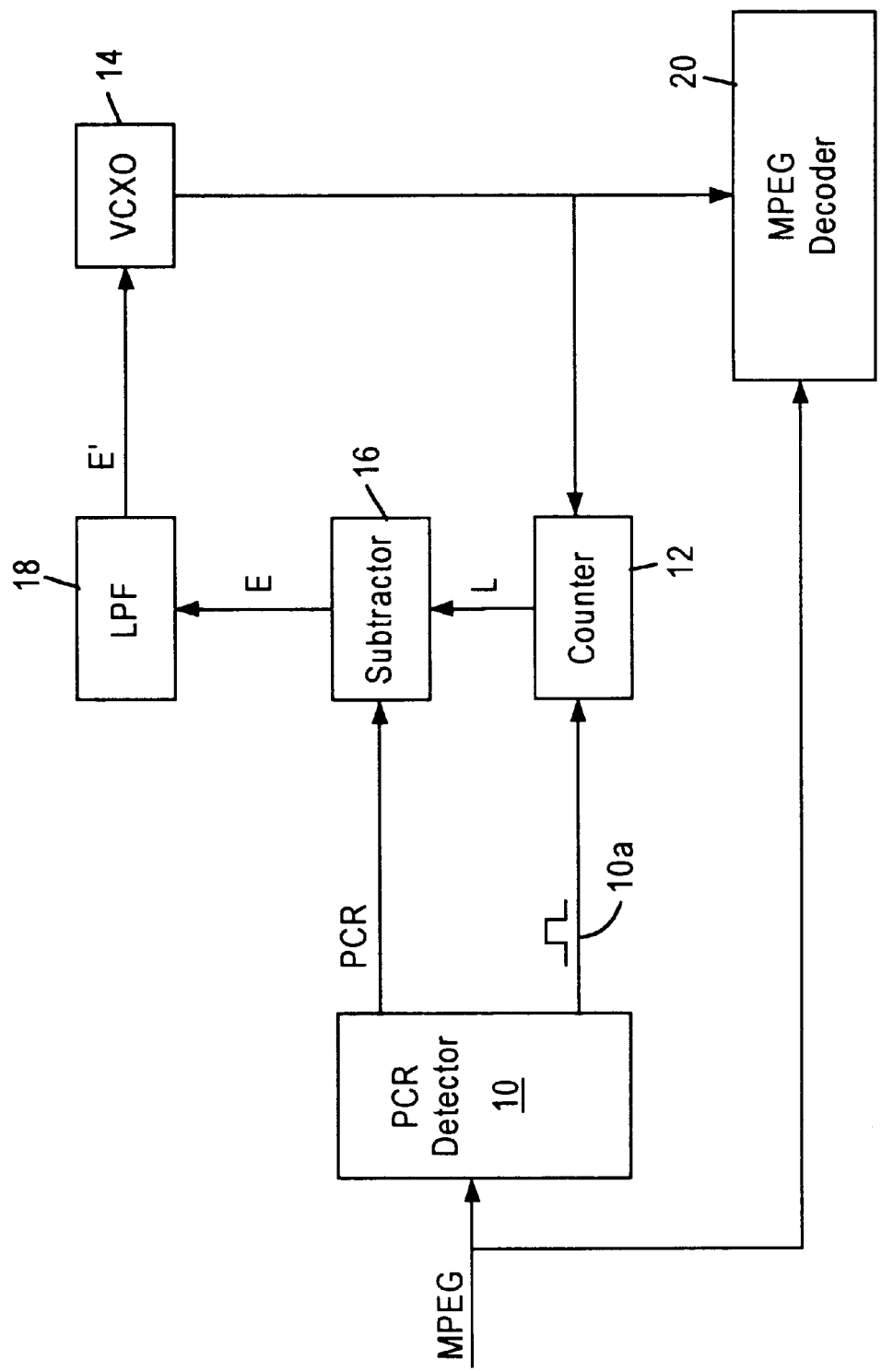
FIG. 1 is a simplified block diagram of a prior art MPEG receiver system.
Figure 7:
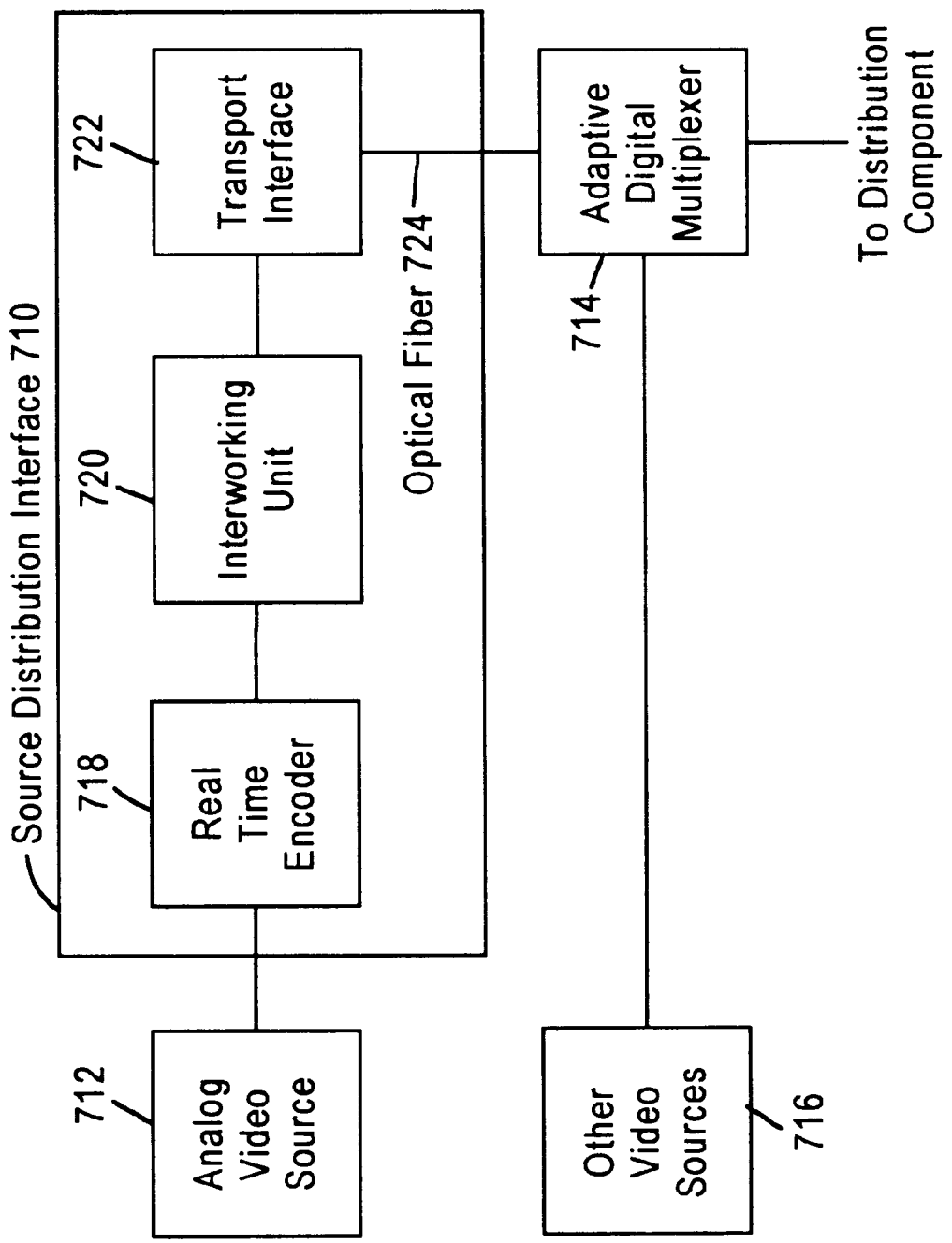
FIG. 7 is a block diagram of an encoding system at a video headend that outputs an ATM cell stream carrying encoded data packets to a broadband distribution system.

FIG. 7 is a block diagram of an encoding system at the video headend of one of the VIPs 40. FIG. 7 corresponds to FIG. 1 of the identified application Ser. No. 08/370,744. FIG. 7 discloses a source distribution interface 710 that generates MPEG-2 streams carrying information from a baseband analog video source 712 to an adaptive digital multiplexer 714 that monitors ATM streams to be supplied to a distribution network. The adaptive digital multiplexer 714 may also receive an ATM stream from a second video source 716. The source distribution interface 710 includes a real time encoder 718 which digitizes and compresses in MPEG-2 format the audio and video signals from the baseband analog video source 712. The real time encoder 718 processes six sets of analog audio/video program signals in parallel, adds program clock references (PCR) to each MPEG-2 bit stream, and outputs six 6 Mbit/s MPEG-2 bit streams as a single 44.736 Mbit/s DS-3 signal to an interworking unit 720.

The interworking unit 720 prepares the MPEG-2 bit streams for ATM cell stream transmission over optical fiber transport links. For example, the interworking unit 720 will divide the bit stream into segments of appropriate length payloads and combine the payloads with ATM headers to obtain an ATM cell stream. The ATM cell stream is supplied to a transport interface 722, which converts the ATM cell stream to optical signals for transmission to the adaptive digital multiplexer via an optical fiber using, for example, an optical fiber transmission standard such as OC-12.

The adaptive digital multiplexer 714 determines whether the entire OC-12 channel capacity of the optical fiber is being utilized. If the optical fiber 724 is not being utilized at capacity, then the adaptive digital multiplexer 714 permits the second video source 716 to use the transport capacity not used by the first broadcast source 712.

The MPEG-2 standard, recognized in the art, provides a standardized syntax and format for packetizing the compressed audio and video information and for transporting other data. Under the MPEG-2 standard, incoming individual video signals and related audio signals are encoded and packetized into respective Video and Audio Packetized Elementary Streams (PES). The video and audio PES's from one or more sources of video programming may be combined into a transport stream for transmission or storage.

Each frame of compressed program information (audio, video or data) is broken down into a series of transport packets. Although compressed video frames can vary in size, the transport packets have a fixed 188 byte size. Thus, different frames are broken down into different numbers of MPEG transport packets. For example, for a 6 Mbits/sec encoding system, a group of frames consisting of a total of 15 frames for one-half second of video breaks down into approximately 2000 transport packets (or 4000 packets per second).

Transport stream packets consist of two sections, a 4 byte header section, an optional adaptation field and a payload section. The header information includes a synchronization byte, a variety of different flags used in reconstruction of the video frames, and a thirteen bit program identification (PID) number. PID value 0 is reserved as an indication that the packet includes program association table data. PID value 1 is reserved for identification of packets containing conditional access data, such as encryption information. Other program identification numbers are utilized to identify transport packets with the program source from which they originate.

Periodically, the transport packet for each program will also include a program clock reference (PCR) value within the optional adaptation field. For example, the PCR may be present in only 10 out of every 4000 video transport packets.

Thus, the encoder 718 compresses up to six NTSC analog audio/video program signals in parallel into an MPEG-2 format. The resulting six MPEG-2 packet streams with the appropriate overhead information are combined into a single MPEG-2 stream at 45 Mbits/sec (DS-3).

The DS-3 transport stream is output from the encoder 718 and supplied to an ATM interworking unit 720 which converts the MPEG-2 packets for the six programs into a single ATM cell stream containing all six programs at the DS-3 rate. In ATM, information is organized into cells having a fixed length and format. Each cell includes a header, primarily for identifying cells relating to the same virtual connection, and an information field or "payload". Specifically, a 53 byte ATM cell includes a cell header consisting of 5 bytes and a payload consisting of 48 bytes of payload data. The ATM cell header information includes a virtual path identifier/virtual circuit identifier (VPI/VCI) to identify the particular communication each cell relates to.

In ATM, transfer is asynchronous in the sense that the recurrence of cells that contain information from any particular sender is not necessarily periodic. Each device using the ATM network 30 submits a cell for transfer when it has a cell to send, not when it has an assigned or available transmission time slot.

However, the ATM cells may ride in synchronous slots on a high-speed time division multiplexed media, such as a SONET optical fiber. ATM allows any arbitrary information transfer rate up to the maximum supported by the ATM network, simply by transmitting cells more often as more capacity is needed.

Thus, the interworking unit 720 converts the MPEG-2 bit streams into cellular payload data, adds cell headers, and outputs the ATM stream. In other words, the interworking unit 720 breaks out the individual programs into cell payloads and adds header information (including VPI/VCI) to map the programs into ATM virtual circuits in the corresponding output cell stream. As noted above, each MPEG packet consists of 188 bytes, whereas each ATM cell includes 48 bytes of payload data. The preferred mapping scheme uses two different adaptations. The first adaptation maps two 188 byte MPEG packets into eight ATM 48 byte cells payloads. The second adaptation maps one 188 byte MPEG packet into five ATM 48 byte cell payloads.

MPEG packets of 188 bytes map efficiently into ATM cells if pairs of packets are mapped into 8 cells. However, a delay is imposed on mapping of a first cell while waiting for the second cell in the pair. To minimize jitter at the decoder, the packets carrying the PCR need to be encoded and transported quickly. To avoid delaying first packets containing a PCR while processing a second packet, the multiplexer 714 maps first packets containing a PCR immediately, using the five cell adaptation procedure. As noted above, the PCR is typically present in a minimum of ten MPEG transport packets every second, with twenty PCR values being typically sent in one second. Also, at least some of those likely will arrive as the second packet of a pair. Consequently, only a very small number of packets are mapped using the less efficient 5-cell adaptation. Some systems perform PCR unaware packing, whereby two 188 byte MPEG transport packets are mapped into 8 cells regardless of the location of a PCR value. This technique may contribute to additional PCR jitter.

As noted above, each cell of a particular stream will have a header which contains a virtual path identifier/virtual circuit identifier (VPI/VCI) to identify the virtual circuit that the cells pertain to. All MPEG packets for a given program, whether video, audio or data, will be mapped into ATM cells having the same VPI/VCI. Conversely, cells having a given VPI/VCI will contain data corresponding to only one identified program. Thus, each ATM cell carrying video information for a specified program from a video information provider can be identified on the basis of its corresponding VPI/VCI.

The transmission of ATM cells in an asynchronous DS-3 signal may require a common clock reference in order to ensure frame alignment in the network. Thus, the six MPEG-2 channels in ATM cell format are supplied to the network in accordance with a physical layer convergence protocol (PLCP). The PLCP is a framing structure used to ensure that ATM cells are aligned with respect to a corresponding video frame, even though there may exist drifting of a start and end of a typical DS-3 frame. Specifically, the PLCP references a DS-3 header and identifies the location of each ATM cell with respect to the DS-3 header. Since the DS-3 frame contains a maximum of twelve ATM cells, the PLCP notes the location of each of the cells 1–12 with respect to the DS-3 header. Therefore, even though there may be DS-3 frame drifting, the PLCP ensures alignment, from a cell perspective, between the cell layer and the DS-3 frame so that each of the twelve ATM cells within each DS-3 frame can be located.

The ATM multiplexing operation by the adaptive digital multiplexer 714, as well as other multiplexing and switching operations in the ATM network 30, may introduce cell delay variation in the ATM cell streams transported throughout the ATM network. Hence, upon reassembling the MPEG-2 packet stream from the ATM cells, the original six 6 Mbit/s MPEG-2 bit streams may have variations in the original 6 Mbit/s data rate if the jitter is not corrected.

Figure 2:
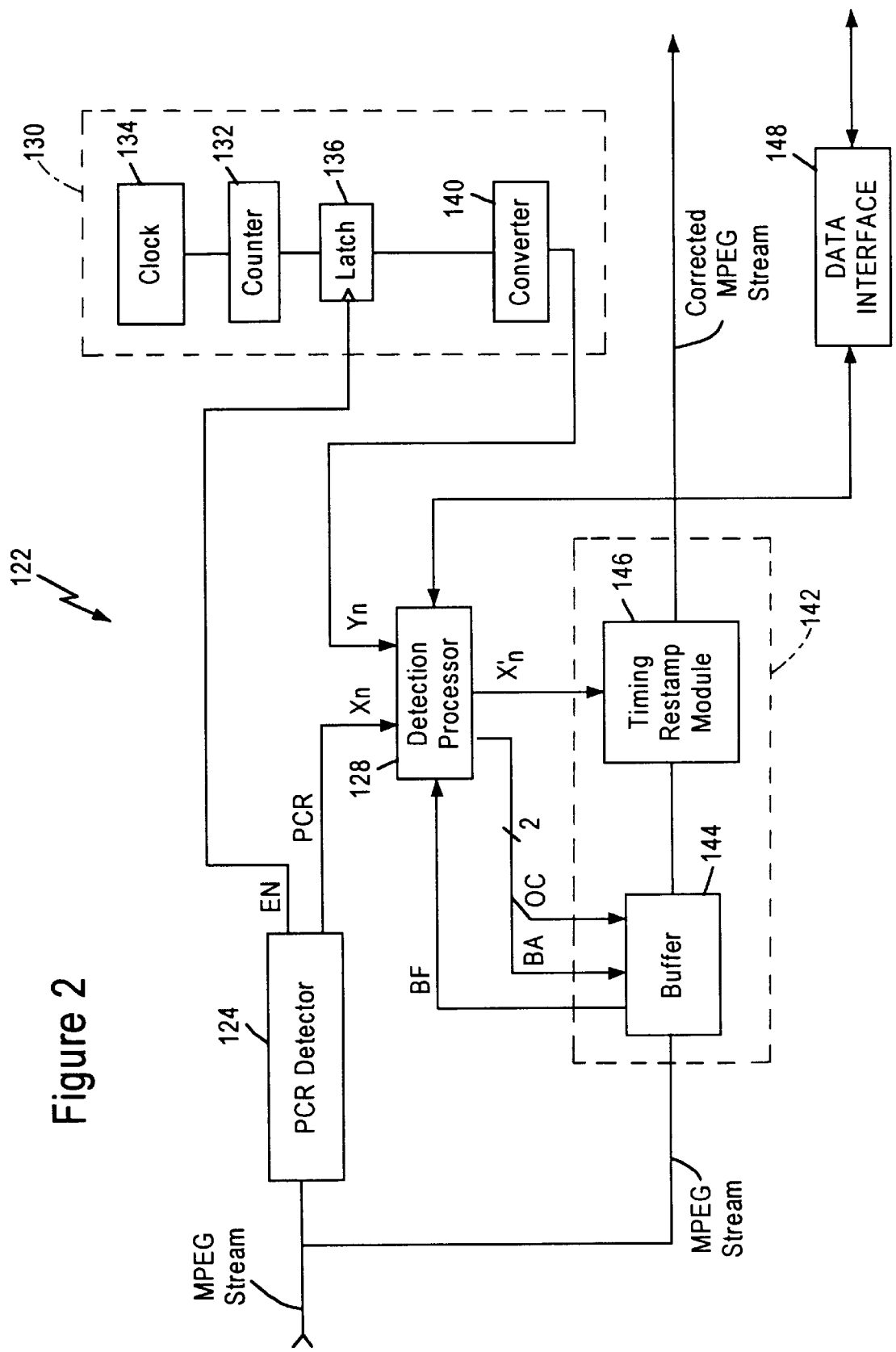
FIG. 2 is a block diagram of a jitter detection device according to an embodiment of the present invention.

FIG. 2 is a block diagram of a jitter correction device according to a preferred embodiment of the present invention. The jitter correction device 122 is adapted to receive a MPEG-encoded data packet stream that has been transported through a broadband transport network. Although the received MPEG-encoded packet stream may have jitter due to transport over various types of networks, the present invention is particularly adapted to correcting for jitter created by cell delay variations during transport via an ATM network. Moreover, although the jitter correction device 122 is disclosed as receiving an MPEG-encoded data stream, it will be appreciated that any digitally coded data stream may be applied that has packets carrying time stamp information at intervals in the data stream. For the sake of simplicity, however, the preferred embodiment is disclosed with respect to a jitter correction device that corrects the data rate of the corrected MPEG stream with respect to the enclosed packets carrying program clock reference (PCR) data.

The MPEG stream supplied to the PCR detector 124 and a correction circuit 142 (discussed in detail below) is a single selected MPEG program having a specific program identification (PID) value. Thus, the jitter correction device 122 will typically receive a specific PID value via an interface 148 from a control source, for example a program selector, to select a specific MPEG stream from a stream of multiplexed MPEG streams.

As shown in FIG. 2, the jitter correction device 122 comprises a PCR detector 124 that detects each occurrence of a PCR value in the MPEG stream. As indicated above, the PCR value represents the expected arrival time of the particular data packet in the data stream. The PCR value is generated during encoding in the real time encoder 718 shown in FIG. 7. The program clock reference PCR value is carried in an optional adaptation field within an MPEG packet, as discussed in detail below with respect to FIG. 3, and is presented at intervals within the transport packets. In this example, the PCR may be present in as few as ten transport packets per second.

Upon detecting a PCR value, the PCR detector 124 outputs a detection signal (EN), and outputs the detected PCR value ($X_n$) to a detection processor 128. The detection processor 128 also receives a signal $Y_n$ representing an actual arrival time for the corresponding data packet stream segment. The signal $Y_n$ is generated by a timing circuit 130 that outputs the actual arrival time signal $Y_n$ in response to the detection signal (EN) from the PCR detector 124, and in response to an independent clock signal.

The timing circuit 130 comprises a counter 132, such as a modulo $2^{30}$ counter, that increments and outputs a count value in response to the independent clock signal generated by clock 134. The independent clock 134 is a clock having a clock rate that is independent of the detection of the PCR values from the received MPEG stream. Thus, unlike the VCXO in FIG. 1, the independent clock 134 is not affected by differential delays in the MPEG stream, and therefore is able to measure the actual arrival time of the MPEG stream segment between successive PCR values.

The independent clock 134 may be implemented as a crystal oscillator that is synchronized to well-known reference time standards. Alternatively, the clock signal may be provided from a separate source, such as a network clock, or a GPS receiver. In any event, the clock 134 is independent of the received MPEG stream and the detected PCR values.

The counter 132 outputs the count value to a latch circuit that latches the count value from the counter 132 in response to the detection signal (EN) from the PCR detector 124. The latch circuit 136 outputs the latched count value to a time converter 140 that converts the count value output by the latch 136 to a recognizable format, such as milliseconds or clock cycles of a 27 MHz clock. Alternatively, the functions of the time converter 140 may be performed in the detection processor 128.

The detection processor 128 calculates the jitter based on the correlation of the expected arrival time $X_n$ and the actual arrival time $Y_n$. The detected jitter value is output to a data network interface 148, such as an Ethernet card, that sends and receives data to and from a control circuit, for example a processor of a digital entertainment terminal (DET). The detection processor 128 also uses the detected jitter value to generate control signals for a data packet stream correction circuit 142 that receives the MPEG stream transported through the network and outputs a corrected data packet stream having PCR values that identify an expected arrival time substantially coinciding with the actual time duration of the corresponding data packet stream segment. The data packet stream correction circuit 142 selectively uses one of two techniques to eliminate the jitter from the MPEG stream caused by, for example, cell delay variation. One technique, as discussed in detail below, involves selectively buffering the MPEG stream using a buffer 144 in response to buffer control signals from the detection processor 128 (BA, OC). The second technique for correcting for the jitter in the MPEG stream is by using a timing restamp module 146, whereby the PCR values stored in the MPEG stream are rewritten with corrected time stamps in accordance with the detected jitter. As shown in FIG. 2, the data packet stream correction circuit comprises the buffer circuit 144 and the time restamp module 146. As such, either technique may be used alone or in combination to provide the corrected MPEG stream.

Figure 3:
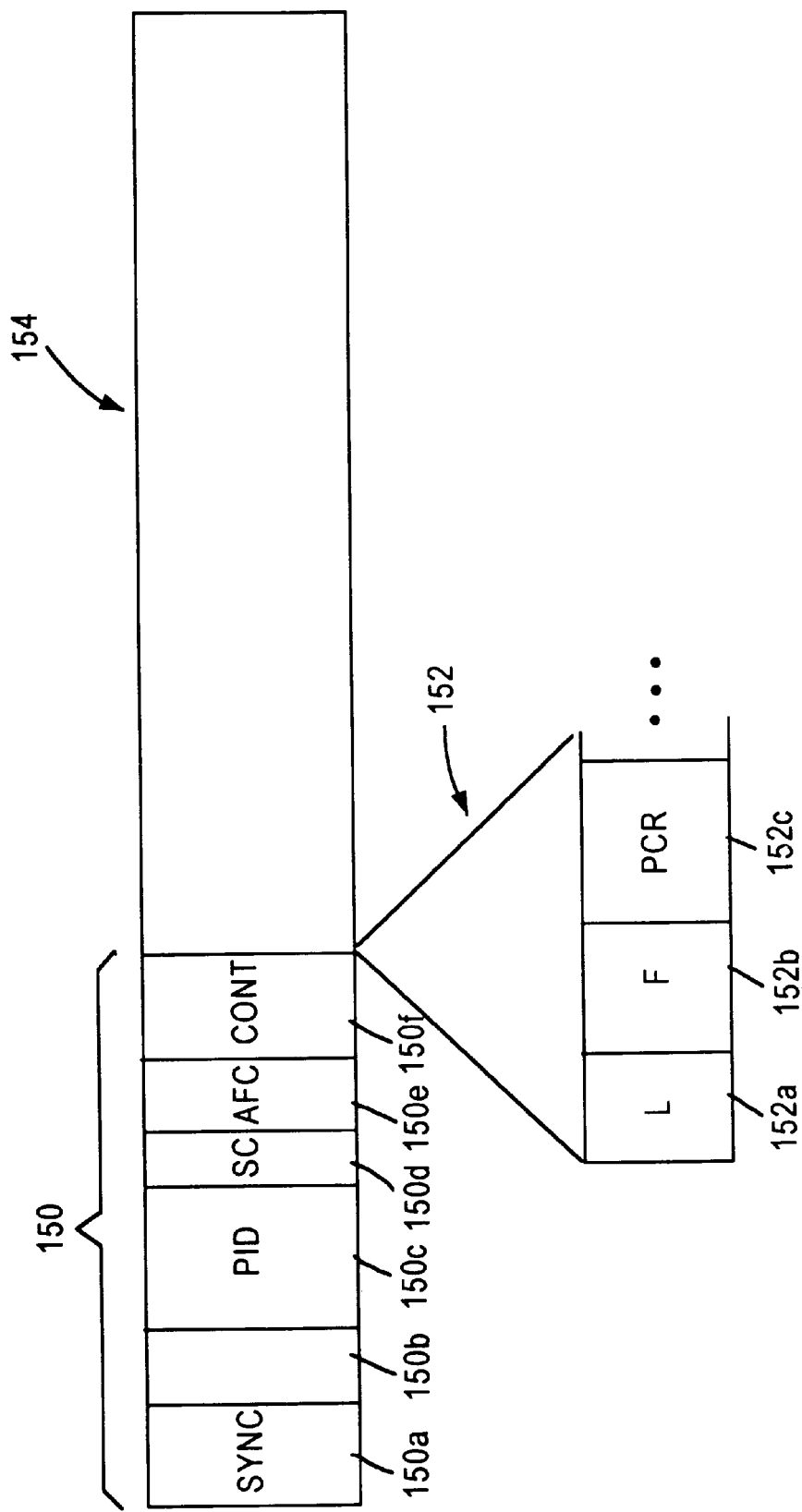
FIG. 3 is a simplified illustration of a format structure of an MPEG-2 encoded data packet.

FIG. 3 is a simplified illustration of a format structure of an MPEG-2 encoded data packet. As discussed above, the MPEG transport packet has a fixed 188 byte size. The transport stream packet shown in FIG. 3 has a 4-byte header section 150, an optional adaptation field 152, and a payload section 154. The header information includes a synchronization byte (SYNC) 150a, a flag portion 150b having three 1-bit flags, for example, start indicator and transport error indicator. The header section 150 also includes a 13-bit program identification (PID) 150c. The header 150 also includes a 2-bit scrambling control (SC) 150d, a 2-bit adaptation field control (AFC) 150e, and a 4-bit continuity counter (CONT) 150f. The adaptation field control 150e identifies the presence of the optional adaptation field 152.

The optional adaptation field 152 comprises a length byte (L) 152a, an 8-bit flag portion (F) 152b, and a 42-bit PCR field 152c. One of the flags in the flag field 152b is a PCR flag, whereby if the flag is set to 1, then the PCR value is present; however, if the PCR flag is 0, then the PCR value is absent. Therefore, the PCR detector 124 identifies the occurrence of the PCR value in the optional adaptation field by reading the adaptation field control 150e to determine whether an optional adaptation field is present. If the 2-bit adaptation field control 150e identifies the presence of the optional adaptation field 152, the PCR detector 124 checks the PCR flag in the flag portion 152b to determine whether the PCR value is present. If the PCR flag indicates that the PCR value is present, the PCR detector outputs the PCR detection signal (EN) and reads the PCR value from the PCR field 152c.

According to the present invention, the jitter is determined by the correlation of expected arrival time and the actual arrival time with an accumulation of expected and actual arrival times of previously-received data packet stream segments. The actual arrival time is measured based on the detection of the PCR values. As such, a voltage controlled oscillator is not used, as opposed to the prior art, which uses a 27 MHz voltage controlled oscillator to synchronize the VCXO to the detected PCR values. Moreover, the independent clock, such as clock 134, may use different data clock rates, as desired. As such, the burden is effectively on the detection processor 128 to calculate the time in seconds, in the absence of the converter 140. Preferably, the converter 140 outputs the differential count values as 27 MHz clock cycles.

Figure 4A:
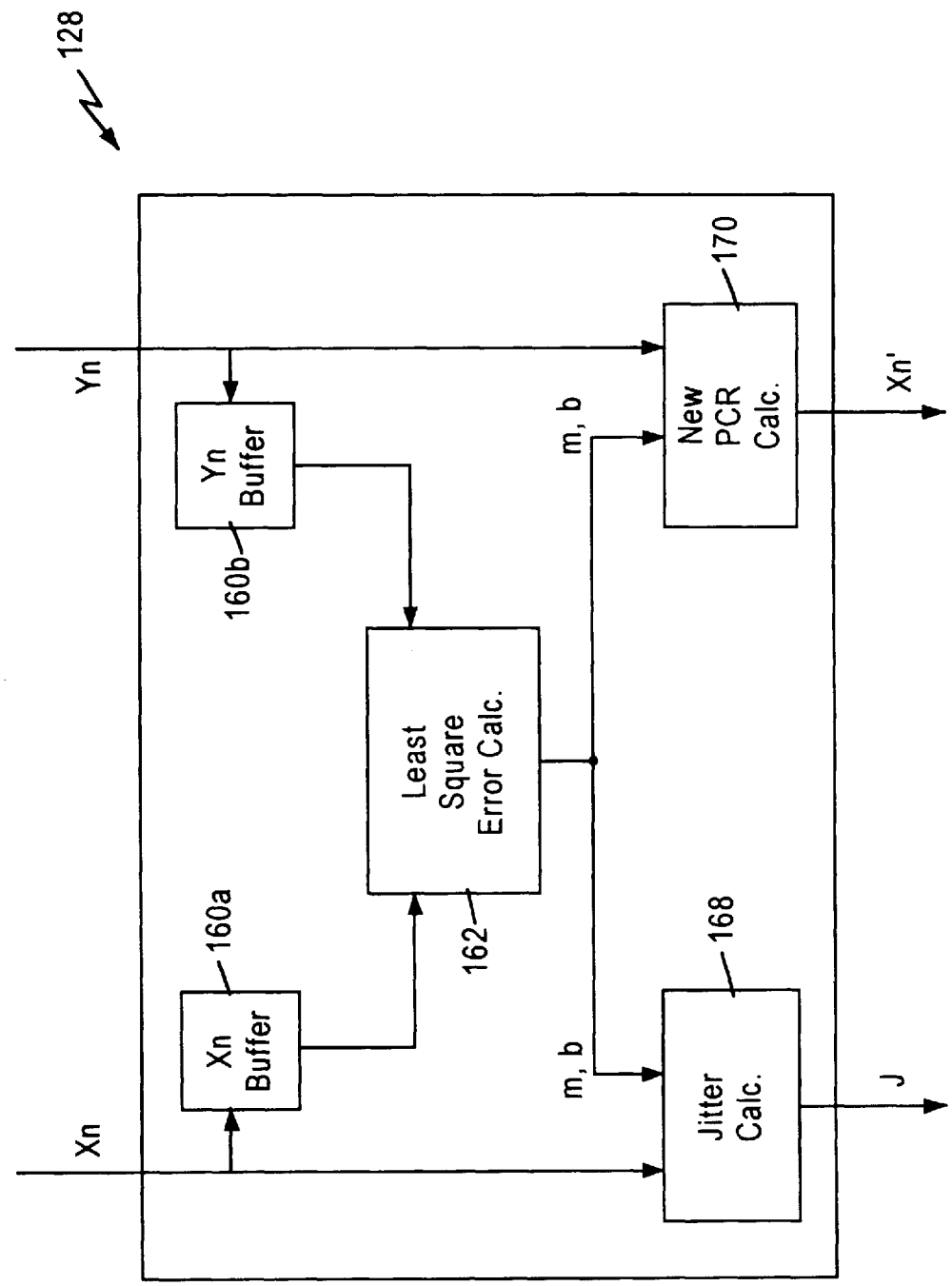
FIGS. 4A and 4B summarize the preferred implementation of the detection processor of FIG. 2.

FIG. 4A is a block diagram illustrating the detection processor 128 of FIG. 2. The detection processor 128 includes a PCR buffer 160a that receives the PCR value ($X_n$) representing the expected arrival time, and a count buffer 160b that receives the count value ($Y_n$) representing the actual arrival time. The buffered values are supplied to a least square error calculator 162 that calculates a least squares line 164, shown in FIG. 4B.

The least square error calculator 162 calculates the least squares line 164 by performing a best fit approximation of a plurality of samples 166 of expected/actual arrival pairs of previously-received data packet stream segments. According to the disclosed embodiment, the calculator 162 accumulates approximately 50–100 samples 166 before performing the best fit approximation. The calculator 162 outputs the slope (m), and y-intercept (b) of the best fit approximation line 164, according to the equation Y=mX+b, to a jitter calculator 168 and a new PCR calculator 170.

Figure 4B:
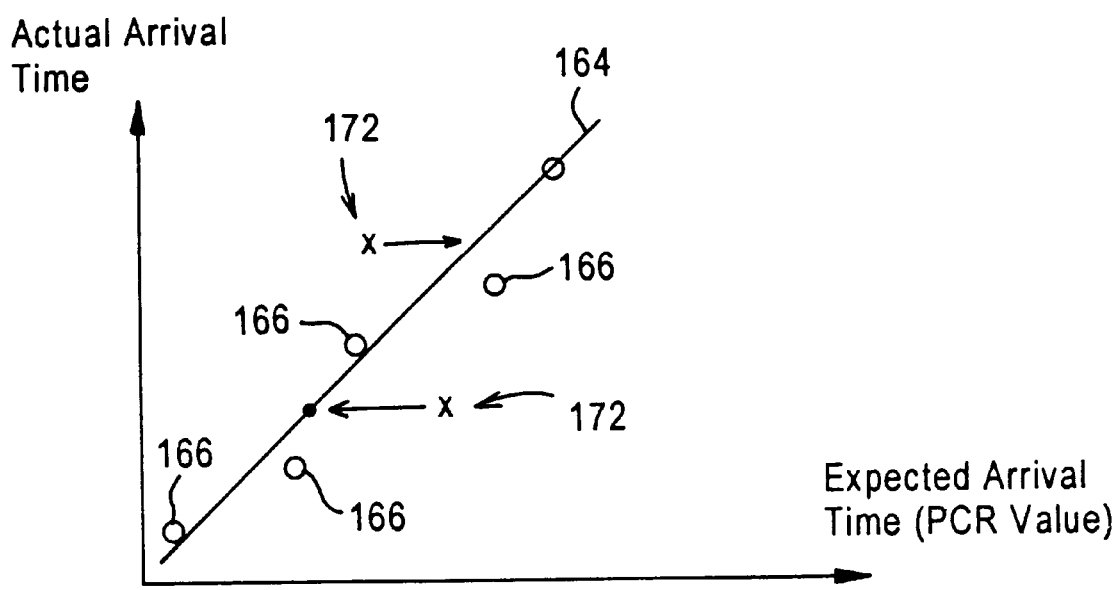

The jitter calculator 168 determines a desired actual arrival time ($Y_n'$) according to the equation $Y_n'=mX_n+b$, representing the ideal location of the arrival time on line 164 with respect to the received PCR value. The jitter J is then calculated as the difference $J=Y_n'-Y_n$. The new PCR calculator 170 recalculates the new PCR value ($X_n'$), also referred to as a restamp value, according to the equation $X_n'=(Y_n-b)/m$. As shown in FIG. 4B, the new PCR calculator 170 effectively shifts the received PCR values 172 to the calculated best fit line 164.

According to the present invention, the estimation accuracy of the PCR values is based on the accuracy of the MPEG clock in the encoder 718 shown in FIG. 7, and the accuracy of the independent clock 134. Thus, according to the preferred embodiment, the jitter can be calculated to a resolution of at least within 10 microseconds.

Referring to FIG. 2, the restamp values calculated by the detection processor 128 are output to the timing restamp module 146 when the timing restamp mode is used in the jitter correction device 122. The timing restamp module 146 includes a restamp writing circuit (not shown) that writes the restamp value $X_n'$ into the PCR field 152c as the corrected PCR value. In the event that a combination of the buffer techniques and the timing restamp techniques is desired, the restamp value Xn' is provided to buffer control circuitry (not shown) in the detection processor 128, which translates the restamp value to the appropriate buffer control signals to the buffer 144.

In addition, the buffer 144 outputs buffer fullness signals (BF) to the detection processor 128 indicating the relative fullness of the buffer 144 with MPEG data. Specifically, the buffer 144 is preferably a first-in, first-out (FIFO) buffer that receives the MPEG stream at a particular input data rate. The input data rate will typically be 6 Mbits/sec, with a maximum rate of 15 Mbits/sec. The buffer 144 should be large enough to carry at least one MPEG stream segment, i.e., at least large enough to carry at least two packets carrying PCR values. As discussed above, the PCR values are typically sent at a rate of twenty per second, giving a typical separation of 0.05 sec. However, since the minimum number of PCR values is specified at ten out of every 4000 packets (i.e., ten per second), the maximum separation possible is 0.1 seconds without jitter. Thus, since the maximum separation between two PCR values is approximately 0.1 seconds, the buffer 144 needs a maximum size of 1.5 Mbits. Typically, however, a data rate of 6 Mbits/sec will require only a buffer having a size of 0.6 Mbits.

In the buffer correction mode, the jitter correction device 122 operates on the assumption that the buffer 144 will have empty locations, depending on the input data rate. Ideally, the buffer 144 is 50% full with valid data. By adjusting the fullness of the buffer 144, the MPEG stream can be adjusted so that the PCR values correspond correctly to the duration, or arrival time of the MPEG stream segment. In other words, the detection processor 128 outputs a buffer adjust control signal (BA) to change the fullness of the buffer 144 in order to lengthen or shorten the MPEG data stream segment by changing the time spacing between the packets output from the buffer.

A second approach using the buffering technique is adjusting the output data rate of the buffer 144.

Specifically, for a 6 Mbit/sec input stream, in which there is no detected jitter, the buffer 144 will output the MPEG stream at a data rate of 6 Mbit/sec. If, however, the detection processor 128 determines the presence of jitter, then the detection processor changes an output clock signal (OC) to increase or decrease accordingly the output data rate of the buffer 144 to compensate for the jitter. Thus, the buffer output data rate is adjusted so that the PCR values correctly correspond to the arrival time of the data stream segment. Thus, if a PCR value entered the PCR detector too early, then the output data rate of the buffer 144 would be slowed down accordingly. If, however, the PCR value entered the PCR detector too late, then the output data rate of the buffer 144 would be increased. Thus, the buffer 144 can be used either to change the spacing between MPEG packets, or to change the output data rate in order to compensate for the detected jitter.

Figure 5A:
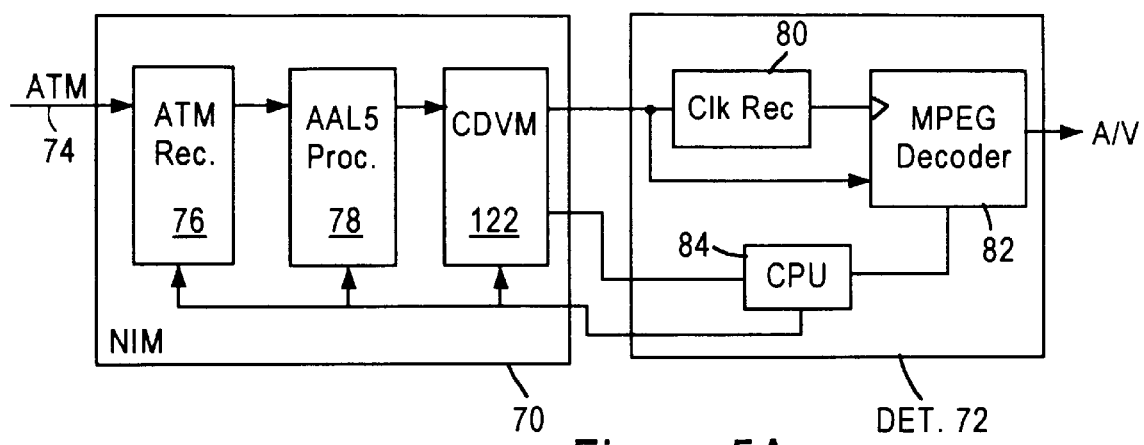
FIGS. 5A, 5B and 5C are exemplary implementations of the jitter correction device in various receiver systems at a subscriber premises.

FIG. 5A discloses an exemplary implementation of the jitter correction device within a network interface module (NIM) 70 for a broadband network that provides specified ATM cell streams to the NIM. The NIM 70 shown in FIG. 5A acts as the network interface at a subscriber premises, also referred to a living unit, between the broadband network and a digital entertainment terminal (DET) 72. The DET 72 is coupled to the NIM by a high bit rate broadband connection and a low bit rate signaling connection. The broadband connection is a one-way downstream only connection, but the low-bit rate signaling connection is a two-way connection, whereby the network interface module includes means to multiplex and demultiplex signals carrying signaling information for transmission/reception over the coaxial cable drop 74.

Typically, each living unit is preassigned a single data stream, or up to three DS-3 slots for broadband service. Although FIG. 5A shows only one DET 72, each home or living unit having a NIM 70 is preferably allocated a capacity of four digital entertainment terminals 72, with three being active at any one time. A coaxial drop 74 for each living unit carries 180 Mbits/sec baseband digital data, which will simultaneously transport three 45 Mbits/sec DS-3 ATM streams. The three channels for a particular living unit are individually assignable to different DET's 72 within the subscriber's premises. The network supplies the DS-3 ATM stream to appropriate channels on the coaxial cable 74 going to the subscriber premises.

As part of an initial handshaking procedure, when a subscriber turns on a DET 72, a DS-3 channel on the particular subscriber's coaxial drop cable 74 is assigned to the DET 72. Upstream and downstream slots are also assigned for signaling purposes, as part of the initial handshaking. When a subscriber requests a broadcast channel, the DET 72 provides a subscriber selection signal identifying the selected channel. In response to the subscriber selection signal, the network transmits a signal to the NIM identifying the particular ATM virtual circuit (VPI/VCI) within that DS-3 stream which carries the requested broadcast program, and routes the particular DS-3 to the appropriate channel on the requesting subscriber's coaxial drop cable 74 going to the subscriber's premises.

The NIM includes means to selectively demodulate received data from an assigned one of the three DS-3 slots on the coax cable 74. Specifically, the NIM 70 captures each ATM cell bearing the specified VPI/VCI header information corresponding to the selected program channel from the DS-3 stream. The NIM 70 includes a ATM cell receiver 76 that captures each ATM cell having a specified VPI/VCI. The ATM cell receiver 76 outputs the captured ATM cells to an AAL5 processor 78, which buffers cells until it finds a cell having an ATM cell Adaptation Unit (AAU) value of "0" in its header (first cell) and another cell having an AAU value of "1" in its header (last cell). The AAL5 processor 78 counts the number of cells from first to last to determine the type of adaptation used to map cells.

If the AAL5 processor 78 has captured a complete protocol data unit (PDU) containing five cells, the AAL5 processor 78 pulls out the payload data and uses the CRC data to check for errors. If there are no errors, the original MPEG packet is reconstructed from the appropriate bytes of payload data from the first four cells. Similarly, if the AAL5 processor 78 has captured a complete PDU containing eight cells, the processor 78 pulls out the payload data, does the CRC based error check, and if there are no errors, the original pair of MPEG packets is reconstructed from the appropriate bytes of payload data from the eight cells. The reconstructed MPEG packets are then output from the AAL5 processor as a reconstructed MPEG packet stream.

As discussed above, the reconstructed MPEG packet stream may have jitter due to cell delay variation during transport through the broadband network. Therefore, the NIM 70 includes the jitter correction device (JCD) 122 disclosed in FIG. 2. Since the jitter correction device 122 is specifically implemented in a network providing ATM cell transport, the jitter correction device 122 is also referred to as a cell delay variation module (CDVM). The CDVM 122 receives the reconstructed MPEG packet stream and selects those MPEG packets that have a specified PID value. The MPEG packets having a specified PID value are processed by the CDVM 122 in order to eliminate the jitter caused by the cell delay variation. The CDVM outputs the corrected MPEG stream to the DET 72 for decompression of the MPEG packets.

The DET 72 comprises a clock receiver 80, an MPEG decoder system 82, and a CPU 84 providing control functions including program selection, session management functions, control channel downloading, etc. A more detailed description of the DET 72 is found in commonly-assigned, copending application Ser. No. 08/380,755, filed Jan. 31, 1995, entitled DIGITAL ENTERTAINMENT TERMINAL WITH CHANNEL MAPPING (attorney docket 680-083C), the disclosure of which is incorporated in its entirety by reference. The clock receiver 80 performs the same functions as prior art clock recovery circuits. Thus, the clock receiver 80 obtains the PCR values from the corrected MPEG stream from the CDVM 122 and synchronizes an internal oscillator with the PCR values from the corrected MPEG stream in order to enable decoding of the corrected MPEG stream. The clock receiver 80 outputs the synchronized clock signal to the MPEG decoder 82 for decompression of the corrected MPEG stream.

On decompression, the MPEG-2 decoder 82 in sequence reconstructs the frames for a particular program from packets bearing the appropriate PID value, decompresses the compressed digital video information, and outputs the decompressed digital video information in the appropriate format to a display device, such as a television or a computer display.

The CPU 84 in the DET 72 may be a Power PC, Pentium, 386 or 486-type microprocessor. Although not shown, the DET 72 also comprises associated memory (RAM, ROM and EPROM). The DET 72 also includes a graphics display generator for generating displays of text data, such as the initial turn-on selection menu for overlay on or replacement of a video program stream. The DET also includes digital to analog converters and appropriate drivers to produce output signals compatible with a conventional television set.

According to the preferred embodiment, the DET 72 is a programmable device with software for broadcast channel selection and decoding residing permanently in the DET memory. Additional software may be downloaded into the DET 72 as applications programs to facilitate certain interactive services. A more detailed description of the structure of the DET and the operations thereof involved in downloading applications software and operating system changes into the DET are disclosed in copending applications Ser. No. 08/250,791, filed May 27, 1994 (attorney docket No. 680-083), and the above-identified application 08/380,755, filed Jan. 31, 1995 (attorney docket No. 680-083C), the disclosures of which are incorporated herein in their entirety by reference.

Figure 5B:
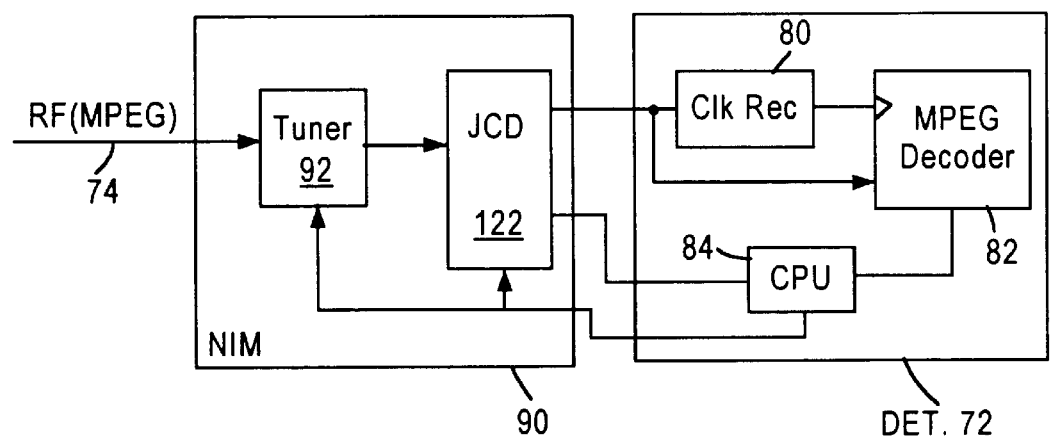

FIG. 5B shows an exemplary implementation of a NIM that is designed to receive a stream of MPEG-encoded data streams on a plurality of RF channels from a coaxial drop cable 74 served by a broadband network providing network transport. The NIM 90 shown in FIG. 5B is designed for use with a network that utilizes a plurality of access technologies to supply broadband data, including ATM transport via optical fiber, and synchronous RF transport via coaxial cable. An exemplary network disclosing the relationship between the NIM and such a hybrid fiber-coaxial ccable arrangement is disclosed in commonly-assigned, copending application Serial No. 08/413,207, filed Mar. 28, 1995, entitled ATM PACKET DEMULTIPLEXER FOR USE IN FULL SERVICE NETWORK HAVING DISTRIBUTED ARCHITECTURE, (attorney docket 680-116), the disclosure of which is incorporated in its entirety by reference.

In this hybrid-fiber coaxial network configuration contemplated with respect to FIG. 5B, the NIM 90 includes an analog frequency tuner 92 controlled by the microprocessor 84 to selectively receive the RF channel signals from the coaxial drop cable 74, including those channels carrying digital information. The NIM also includes a QPSK, QAM or VSB demodulator (not shown) to demodulate a selected one of the digitized program signals carried in one of the digital slots within a received 6 MHz channel and performs a forward error correction function on the demodulated data.

The analog tuner 92 in the NIM 90 tunes in all channel frequencies carried by the network, including those used for the analog broadcast services. The RF tuner 92 translates the desired channel, containing either digital or analog information, to a 43.75 MHz IF signal. The IF signal contains either digital or analog information. The tuner 92 utilizes a dual conversion technique with synthesized local oscillators, and has an input tuning range of 50 MHz to 860 MHz. The tuner 92 demodulates the RF signal at a user-specified channel frequency.

If the demodulated RF signal is an analog video signal from an analog source, the NIM 90 passes the baseband analog video signal directly to the television set (not shown) without further processing by the DET 72. If, however, the NIM 90 receives an MPEG encoded signal, if the MPEG encoded signal has a PID value corresponding to the NIM's assigned PID value, the NIM 90 processes the MPEG stream as NIM signaling data after jitter correction by the jitter correction device 122. If, however, the PID value corresponds to the DET address, the NIM performs MPEG processing on the MPEG stream as DET signaling data, performs jitter correction in the jitter correction device (JCD) 122, and outputs the recovered DET signaling data to the DET CPU. Otherwise, the corrected MPEG stream is passed to the DET as information-carrying (e.g., video) MPEG streams after the NIM has de-encrypted the 27 Mb/s MPEG encoded signal using a key downloaded from the network. The processor 84 within the main portion of the DET 72 identifies an MPEG stream to be transmitted to the DET 218 by the PID value.

Thus, the DET 218 decodes only an MPEG stream having a specified MPEG PID value in accordance with the user's request for service.

Although the NIM 90 is disclosed as having only one JCD 122, in actual implementation there may be three such devices dedicated for different data streams: NIM signaling data, DET signaling data, and DET broadband data (e.g., video). Alternately, the JCD 122 may be programmable to process and route corrected MPEG data streams in response to PID values supplied by the CPU 84.

Although not shown, the DET 72 includes a remote control and/or keypad to receive various selection signals from a user. The DET relays data signals upstream over a signaling channel on the coaxial cable 74 to the network in response to user inputs such as selection of a pay per view event.

The MPEG decoder 82 includes an audio and video portion (not shown), whereby the video portion decompresses received video packet signals to produce a digital video signal, and the audio portion of the MPEG decoder 82 decompresses received audio packets to produce left and right digitized stereo signals. For at least some functions, the MPEG decoder may be controlled in response to signals from the microprocessor. The video portion of the MPEG decoder will internally include at least 2 MBytes of RAM for use as a frame reorder buffer for at least two frames during the MPEG video decoding process, and the audio portion of the MPEG decoder also may include some buffer memory.

Figure 5C:
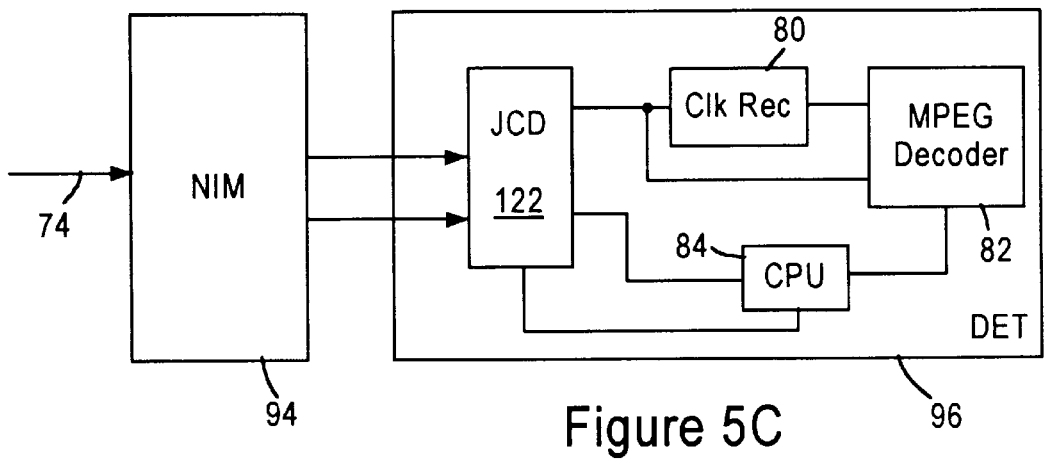

FIG. 5C discloses an alternative arrangement of the NIM/DET receiver system that can be used used in any broadband network providing broadband data to a NIM 94 via the coaxial drop cable 74. In this arrangement, the NIM 94 is similar to the network interfaces 70 and 90 in that NIM 94 acts as a network-specific interface for receiving data signals from a broadband network. For example, in a hybrid-fiber coax architecture such as suggested in FIG. 5B, the NIM 94 could be identical to the NIM disclosed in the identified copending application 08/413,207 (attorney docket 680-116). Thus, the NIM 94 would provide the same MPEG-encoded connections to the DET 96, namely a high data rate broadband connection and a low data rate signaling connection.

The digital entertainment terminal 96 in FIG. 5C, however, differs from the DET 72 in that the jitter control device 122 is implemented within the DET 96 and receives the high data rate MPEG streams and the low data rate MPEG streams to perform jitter correction before being output to the other DET components. Alternatively, if jitter correction on the low data rate MPEG stream is not necessary, the jitter control device 122 may be bypassed, so that only the high data rate (broadband) MPEG streams are supplied to the jitter correction device 122. Thus, the digital entertainment terminal 96 is an improvement over the DET 72 in that the DET 96 has its own jitter correction circuitry.

Specifically, the NIM 94 is specialized to the network access technology and data stream format provided by the coaxial drop cable 74. Thus, the NIM 94 will be substituted at a subscriber premises depending on the local access technology, such as fiber to the home, or ADSL as suggested in the above-identified Litteral patent. The NIM/DET interface, however, follows a generic consumer electronics (CE) protocol. Thus, when implemented as a consumer product, the DET 96 is able to minimize jitter in any broadband network, regardless of the access technology.

Figure 6:
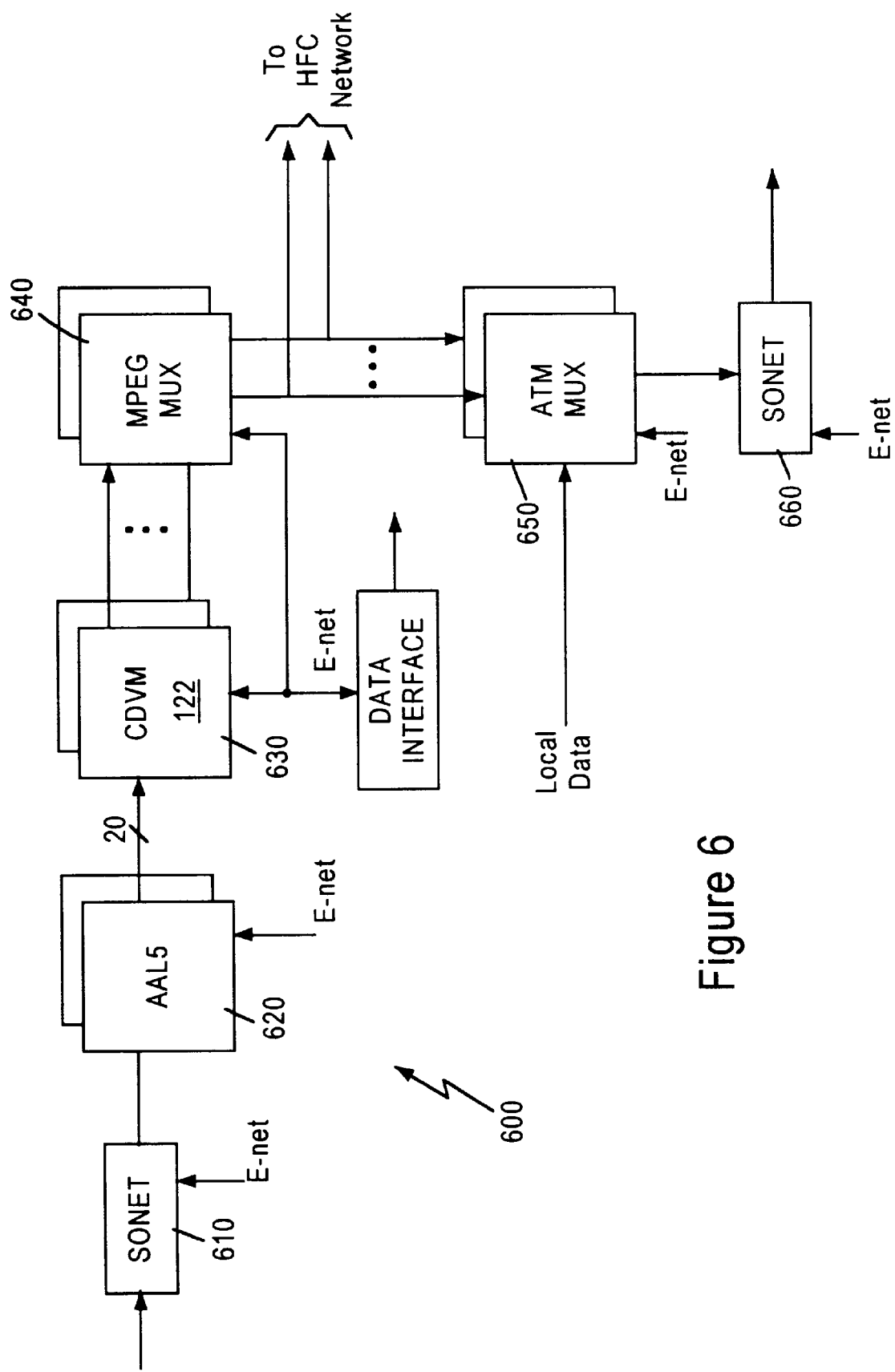
FIG. 6 is a block diagram of the cell delay variation monitor implemented in a network node.

FIG. 6 discloses an ATM packet demultiplexer implementing the cell delay variation module of the present invention. The ATM packet demultiplexer is of the type described in the identified, copending application Ser. No. 08/413,207, (attorney docket 680-116).

Specifically, the ATM packet demultiplexer is typically used at the terminal 48a, also referred to as a video end office, to demultiplex ATM cell streams from the ATM broadband network to MPEG-encoded data output on selected RF channels to a local loop distribution network. The cell delay variation module 122 of the present invention is added to eliminate jitter present in the MPEG-encoded data before transmission to the local loop distribution network. However, the ATM packet demultiplexer may also be used to minimize cell delay variations in ATM cell streams carrying MPEG data multiplexed with local data before further transmission on the ATM network. In other words, the corrected MPEG stream may be repacketed by an ATM multiplexer that outputs the corrected MPEG stream in a new ATM cell stream for further transmission on the network.

The disclosed ATM packet demultiplexer (APD) is designed to process an ATM cell stream having a specified VPI/VCI value. Thus, a plurality of APD's will typically be arranged in parallel when implemented in the ATM network, whereby each APD will receive a dedicated virtual path on the basis the a predetermined VPI/VCI range. In other words, each APD serves a predetermined range of VPI/VCI values on the dedicated virtual path.

As shown in FIG. 6, the preferred ATM packet demultiplexer 600, also referred to as an MPEG router, comprises an input processor 610, an ATM adaptation layer (AAL5) processor 620, a cell delay variation module 630, and a transport multiplexer (MPEG MUX) 640. When implemented as an actual node of the ATM network 50, the jitter correction node will also include an ATM multiplexer 650 and an output interface 660. The input processor 610 is preferably a SONET interface that receives OC-3c ATM stream from ATM network 50. The interface 610 performs clock and frame recovery of the SONET frame, cell delineation, Header Error Check (HEC) verification, and deletion of unassigned or idle ATM cells. The ATM stream is output to the AAL5 processor 620.

The AAL5 processor 620 performs ATM Adaptation Layer (AAL-5) processing to reassemble the ATM cell payloads and perform a CRC and length check. Specifically, the AAL5 processor 620 buffers cells until it finds a cell having an ATM cell Adaptation Unit (AAU) value of "0" in its header (first cell) and another cell having an AAU value of "1" in its header (last cell). The AAL5 processor 620 counts the number of cells from first to last to determine the type of adaptation used to map cells.

If the AAL5 processor 620 has captured five cells, the receiver pulls out the payload data and uses the CRC data to check for errors. If there are no errors, the original data is reconstructed from the appropriate bytes of payload data from the first four cells. Similarly, if the receiver has captured eight cells, the AAL5 processor 620 pulls out the payload data, does the CRC based error check, and if there are no errors, the original data contained in the Protocol Data Unit (PDU) is reconstructed from the appropriate bytes of payload data from the eight cells.

The PDU's carrying broadband data are output to the CDVM 630 to correct for jitter caused by cell delay variation in accordance with commands supplied from the OSS via the Ethernet interface 635, as discussed above in detail with respect to FIG. 2. The corrected MPEG stream is then output to an MPEG multiplexer 640 for multiplexing to the appropriate output stream. Although not shown, the APD 600 may also include additional components for multiplexing the MPEG-encoded data streams for distribution in the hybrid fiber coax-type (HFC) network, such as an out-of-band signalling processor outputting signalling data.

The MPEG multiplexer 640 multiplexes the corrected MPEG streams to one of five output 27 MB/s transport streams in accordance with the routing information from the OSS via Ethernet. In addition, the MPEG multiplexer 640 monitors PID faults, erroneous packets, loss packets, and redundant packets in each transport stream. Finally, the MPEG multiplexer 640 outputs the five 27 MB/s transport streams to either a TAXI interface (not shown), which outputs the five 27 MB/s transport streams to QAM modulators for distribution to the HFC network, or to an ATM multiplexer 650, which performs ATM cell processing to output an new stream of ATM cells to a SONET output interface 660.

The present invention provides an arrangement for detecting and correcting jitter in encoded data streams caused by cell delay variations during transport through the packet switched network. The disclosed system provides localized jitter correction at the detection site resulting in corrected MPEG streams, whereby the stored PCR values identify an expected arrival time substantially coinciding with the actual time duration of the corresponding data packet stream segment from the corrected MPEG stream. Unlike the prior art, the variations in the PCR values are detected using an independent clock source, thereby ensuring that no errors arise due to jitter in the MPEG stream. Moreover, the correlation of the expected arrival time and actual arrival time with a best fit approximation of expected/actual arrival pairs of previously-received data packet stream segments ensures accurate correction of the PCR values, either by selectively buffering the received MPEG stream, by restamping the stored PCR values with corrected PCR values, or a combination of the two.

Although the preferred embodiment of the present invention has been described with respect to the transport of MPEG-encoded data streams in an ATM network, it will be appreciated that any coding standard can be used for the data being transported, so long as the coded data stream includes time stamp information identifying an expected arrival time of the corresponding data packet stream segment.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for measuring jitter in a transport stream of data packets, comprising:
a time stamp detector detecting time stamp values located within said transport stream, each time stamp value identifying an expected arrival time of a corresponding interval portion of said transport stream;
a counting portion, responsive to a clock signal independent of the transport stream, for identifying an actual arrival time for each said corresponding interval portion of said transport stream;
a detecting circuit detecting jitter in each data packet stream segment by executing a correlation of the corresponding expected arrival time and the corresponding actual arrival time with an accumulation of expected and actual arrival times of previously-received data packet stream segments.

2. An apparatus as recited in claim 1, wherein said data packets are MPEG-encoded data packets, said time stamp detector detecting said time stamp values as program clock reference (PCR) values from an MPEG stream having a selected program identifier (PID) value.

3. An apparatus as recited in claim 2, wherein said time stamp detector outputs a detection signal upon detecting each of said PCR values, said counting portion comprising:
a counter for outputting a count value in response to said clock signal; and
a latch circuit latching and outputting said count value in response to said detection signal, said count value corresponding to said actual arrival time.

4. A method for measuring jitter in a transport stream of MPEG-encoded data packets, comprising the steps of:
receiving a clock signal independent from the transport stream;
detecting program clock reference (PCR) values from said transport stream, each PCR value identifying an expected arrival time of a corresponding interval portion of said transport stream;
identifying an actual arrival time for each said corresponding interval portion of said transport stream in response to said independent clock signal;
determining a desired actual arrival time for said each corresponding interval portion in response to an accumulation of respective PCR values and actual arrival times of prior portions of the transport stream; and
calculating said jitter based on a difference between each actual arrival time and the corresponding actual arrival time.

5. A method as recited in claim 4, further comprising the steps of:
receiving said MPEG-encoded data packets from an asynchronous transfer mode (ATM) stream of cells; and
selecting at least one of said MPEG streams in accordance with a selected program identifier (PID) value.

6. A broadband receiver for receiving a data stream carrying asynchronous transfer mode (ATM) cells from a broadband network, comprising:
an ATM stream selector for capturing a selected group of said ATM cells on the basis of a selected identifier value;
an ATM adaptation layer processor for recovering from said group of said ATM cells a digital data stream carrying time stamp values, each time stamp value representing an expected arrival time of a corresponding digital data stream segment from said digital data stream; and
a cell delay variation correction circuit comprising:
(1) a segment delay detection circuit determining an actual arrival time of the corresponding digital data stream segment by detection of the corresponding time stamp value relative to an independent clock signal, the delay detection circuit calculating an approximated relation between actual arrival times and corresponding time stamp values from previously-received digital data stream segments, and
(2) a digital data stream correction circuit, responsive to the actual arrival time and the approximated relation, outputting said digital data stream as a corrected data packet stream having time stamps identifying an expected arrival time substantially coinciding with an actual time duration of the corresponding data packet stream segment of said corrected data packet stream, said corrected data packet stream being output for decompression to obtain information for use by a subscriber.

7. A receiver as recited in claim 6, further comprising a digital entertainment terminal (DET) comprising:
a program selection circuit for outputting said selected identifier value in response to a user input;
a clock recovery circuit, said clock recovery circuit being synchronized in accordance with said time stamps from said corrected data packet stream; and
a decoder for decoding said information from said corrected data packet stream in response to timing signals from said clock recovery circuit.

8. A receiver as recited in claim 7, wherein said corrected data packet stream is in MPEG format.

9. A receiver as recited in claim 6, wherein said digital data stream correction circuit comprises a buffer circuit receiving said digital data stream for adjusting said actual time duration of each said corresponding data packet stream segment in accordance with the approximated relation and the corresponding time stamp value.

10. A receiver as recited in claim 9, wherein said buffer circuit has an output data rate controlled in response to said approximated relation and the corresponding time stamp value.

11. A receiver as recited in claim 9, wherein said buffer circuit selectively adjusts a spacing between packets in said digital data stream stream in accordance with said approximated relation and the corresponding time stamp value.

12. A receiver as recited in claim 9, wherein said buffer circuit adjusts said actual time duration in accordance with said approximated relation and a buffer fullness ratio.

13. A receiver as recited in claim 9, wherein said digital data stream correction circuit further comprises a timing restamp module replacing said detected time stamp values with said time stamps identifying an expected arrival time substantially coinciding with an actual time duration of said corresponding data packet stream segment.

14. An receiver as recited in claim 6, wherein said digital data stream correction circuit comprises a timing restamp module replacing said detected time stamp values with said time stamps identifying an expected arrival time substantially coinciding with an actual time duration of said corresponding data packet stream segment.

15. A converter for converting a data stream of asynchronous transfer mode (ATM) cells carrying MPEG-encoded data into an MPEG-encoded packet stream, comprising:
   an ATM stream selector for capturing a selected group of said ATM cells on the basis of a selected identifier value;
   an ATM adaptation layer processor for recovering from said group of said ATM cells said MPEG-encoded packet stream carrying program clock reference (PCR) values, each PCR value representing an expected arrival time of a corresponding segment from said MPEG-encoded packet stream; and
   a cell delay variation correction circuit comprising:
      (1) a segment delay detection circuit determining an actual arrival time of the corresponding digital data stream segment by detection of the corresponding PCR value relative to an independent clock signal, the delay detection circuit calculating an approximated relation between actual arrival times and corresponding PCR values from previously-received digital data stream segments, and
      (2) a digital data stream correction circuit, responsive to the actual arrival time and the approximated relation, outputting said digital data stream as a corrected data packet stream having PCR values identifying an expected arrival time substantially coinciding with an actual time duration of the corresponding data packet stream segment of said corrected data packet stream, said corrected data packet stream being output for decompression to obtain information for use by a subscriber.

16. A converter as recited in claim 15, wherein said digital data stream correction circuit comprises a buffer circuit, receiving said MPEG-encoded packet stream from said ATM adaptation layer processor, for adjusting said actual time duration in accordance with the actual arrival time of the corresponding PCR values and the approximated relation.

17. A receiver as recited in claim 16, wherein said buffer circuit has an output data rate controlled in response to said approximated relation.

18. An apparatus as recited in claim 16, wherein said buffer circuit selectively adjusts a spacing between packets in said MPEG-encoded packet stream in accordance with said approximated relation.

19. An apparatus as recited in claim 16, wherein said buffer circuit adjusts said actual time duration in accordance with approximated relation, the corresponding PCR value and a buffer fullness ratio.

20. An apparatus as recited in claim 16, wherein said digital data stream correction circuit further comprises a timing restamp module replacing said detected PCR values with said PCR values identifying an expected arrival time substantially coinciding with said actual time duration of said corrected MPEG-encoded packet stream.

21. An apparatus as recited in claim 15, wherein said digital data stream correction circuit comprises a timing restamp module replacing said detected PCR values with said PCR values identifying an expected arrival time substantially coinciding with said actual time duration of said corrected MPEG-encoded packet stream.

22. A digital entertainment terminal (DET) for receiving an MPEG-encoded packet stream after transport via an asynchronous transfer mode (ATM) network, comprising:
   an MPEG stream alignment circuit for receiving the transported MPEG-encoded packet stream and outputting an aligned MPEG stream having program clock reference (PCR) values corrected based on PCR values of previously-received MPEG-encoded packet streams;
   a clock synchronization circuit for outputting a clock pulse in accordance with the PCR values of said aligned MPEG stream; and
   an MPEG decoder for decoding said aligned MPEG stream in accordance with the clock pulse.

23. A digital entertainment terminal (DET) for receiving an MPEG-encoded packet stream after transport via an asynchronous transfer mode (ATM) network, comprising:
   an MPEG stream alignment circuit for receiving the transported MPEG-encoded packet stream and outputting an aligned MPEG stream having program clock reference (PCR) values corrected based on PCR values of previously-received MPEG-encoded packet streams;
   a clock synchronization circuit for outputting a clock pulse in accordance with the PCR values of said aligned MPEG stream; and
   an MPEG decoder for decoding said aligned MPEG stream in accordance with the clock pulse, wherein said MPEG stream alignment circuit comprises:
      a time stamp detector for detecting the PCR values within said transported MPEG-encoded packet stream, each PCR value representing an expected arrival time of a corresponding data packet stream segment;
      a timing circuit, responsive to an independent clock signal, for determining an actual arrival time for each said corresponding data packet stream segment;
      a detecting circuit for detecting jitter in said data packet stream on the basis of an estimated relation between the PCR values of previously-received MPEG-encoded packet streams and the corresponding actual arrival times; and
      a data packet stream correction circuit, responsive to the detected jitter, outputting said aligned MPEG stream as a corrected data packet stream having PCR values identifying an expected arrival time substantially coinciding with an actual time duration of the corresponding data packet stream segment of said corrected data packet stream.

24. A terminal as recited in claim 23, wherein said data packet stream correction circuit comprises a buffer circuit receiving said transported MPEG-encoded packet stream for adjusting said actual time duration of each said corresponding data packet stream segment in accordance with said corresponding detected jitter.

25. A terminal as recited in claim 24, wherein said buffer circuit has an output data rate controlled in response to said detected jitter.

26. A terminal as recited in claim 24, wherein said buffer circuit selectively adjusts a spacing between packets in said transported MPEG-encoded packet stream in accordance with said detected jitter.

27. A terminal as recited in claim 24, wherein said buffer circuit adjusts said time duration in accordance with said corresponding detected jitter and a buffer fullness ratio.

28. A terminal as recited in claim 24, wherein said data packet stream correction circuit further comprises a timing restamp module replacing said PCR values in said transported MPEG-encoded packet stream with corrected PCR values in accordance with said detected jitter.

29. A terminal as recited in claim 23, wherein said data packet stream correction circuit comprises a timing restamp module replacing said PCR values in said transported MPEG-encoded packet stream with corrected PCR values in accordance with said detected jitter.

30. A method for recovering timing in a coded data transport stream having jitter caused by delays generated during network transport, comprising the steps of:
   receiving an independent clock signal;
   detecting time stamp values from said coded data transport stream, each time stamp value identifying an expected arrival time of a corresponding interval portion of said coded data transport stream;
   identifying an actual arrival time for each said time stamp value in accordance with said independent clock signal;
   calculating an approximated relation between time stamp values and corresponding actual arrival times of previously-received portions of said coded data transport stream; and
   correcting said coded data transport stream in response to the approximated relation and the actual arrival time to have time stamp values identifying an expected arrival time that substantially coincides with an actual time duration of the corresponding segment of the corrected coded data transport stream.

31. A method as recited in claim 30, wherein said coded data transport stream is MPEG-encoded data and said time stamp values are PCR values.

32. A method as recited in claim 30, wherein said correcting step comprises the steps of:
   supplying said coded data transport stream to a buffer circuit; and
   adjusting said actual time duration in said buffer circuit in accordance with the approximated relation and the actual arrival time.

33. A method as recited in claim 32, wherein said adjusting step comprises the step of varying an output data rate of said buffer circuit in response to the approximated relation and the actual arrival time.

34. A method as recited in claim 32, wherein said adjusting step comprises the step of selectively adjusting in said buffer circuit a spacing between packets in said coded data transport stream in accordance with the actual arrival time.

35. A method as recited in claim 32, wherein said adjusting step comprises the step of adjusting said actual time duration in said buffer circuit in accordance with said actual arrival time and a buffer fullness ratio.

36. A method as recited in claim 32, wherein said adjusting step comprises the step of replacing said detected time stamp values with said time stamp values values identifying an expected arrival time substantially coinciding with said actual time duration of said corrected coded data transport stream.

37. A method as recited in claim 30, wherein said adjusting step comprises the step of replacing said detected time stamp values with said time stamp values identifying an expected arrival time substantially coinciding with said actual time duration of said corrected coded data transport stream.

38. An ATM network node for supplying broadband data received as ATM cell streams having respective VPI/VCI values, comprising:
   an ATM processor receiving said ATM cell streams carrying said broadband data, said ATM processor assembling protocol data units (PDU'S) from said ATM cell streams on the basis of a corresponding VPI/VCI and outputting a first stream of broadband data generated from the assembled payload data units, said first stream of broadband data exhibiting transport delay variations due to cell delay variations and time stamp values representing an expected arrival time of a corresponding packet stream segment of said first stream of broadband data; and
   a cell delay variation processor for processing said first stream of broadband data to eliminate said transport delay variations and output a digitally-coded transport stream of said broadband data, said digitally-coded transport stream carrying time stamp values corresponding to an actual arrival time of corresponding transport stream segments of said digitally-coded transport stream.

39. An ATM network node as recited in claim 38, further comprising a transport multiplexer for multiplexing said digitally-coded transport stream of said broadband data to a broadband network.

40. An ATM network node as recited in claim 38, wherein said cell delay variation processor comprises:
   a segment delay detection circuit for determining a delay between said expected arrival time of a corresponding segment of said first stream of broadband data having a selected identifier value and an actual arrival time, said segment delay detection circuit calculating said actual arrival time in response to a detection of said corresponding pair of time stamp values and a clock signal from an independent source the delay being determined from correlating expected arrival times and corresponding actual arrival times of previously-received segments of said first stream of broadband data; and
   a digital data stream correction circuit, responsive to the determined delay, outputting said digitally-coded transport stream having the selected identifier value as a corrected data packet stream having time stamps identifying an expected arrival time substantially coinciding with an actual time duration of the corresponding segment of said digitally-coded transport stream.

41. An ATM network node as recited in claim 40, further comprising an ATM multiplexer outputting said digitally-coded transport stream to an ATM network.

42. A method comprising:
   detecting a first time stamp value at the beginning of a segment in a digital data transport stream subjected to differential delays;

in response to the first time stamp value, recording a first actual arrival time value;

measuring a delay imposed on the segment by calculating a difference between the first actual arrival time value and an estimated actual arrival time value, the estimated actual arrival time value based on a correlation between detected time stamp values and corresponding recorded actual arrival time values from previously received segments of the digital data transport stream;

processing the segment to compensate for the measured delay imposed on the segment; and decoding the processed segment at a clock rate synchronized by time stamp values contained in the segment.

43. The digital entertainment terminal of claim 22, wherein, said MPEG stream alignment circuit comprises a timing restamp module replacing said PCR values in the transported MPEG-encoded packet stream with corrected PCR value in accordance with the PCR values of the previously-received MPEG-encoded packet streams.

44. The digital entertainment terminal of claim 22, wherein the MPEG stream alignment circuit include a detection processor for detecting jitter based on a correlation between the previously-received MPEG encoded packet streams and the transported MPEG-encoded streams.

45. The digital entertainment terminal of claim 44, wherein the MPEG stream alignment circuit further comprises a timing circuit, responsive to an independent clock signal, for determining an actual arrival time for each said corresponding data packet stream segment, the actual arrival time used to establish said correlation.

46. The digital entertainment terminal of claim 22, wherein the MPEG stream alignment circuit comprises a timing circuit, responsive to an independent clock signal, for determining an actual arrival time for each said corresponding data packet stream segment, the actual arrival time used to establish said correlation.

* * * * *